(12) United States Patent
Levijoki et al.

(10) Patent No.: US 8,286,419 B2
(45) Date of Patent: Oct. 16, 2012

(54) EXHAUST DIAGNOSTIC SYSTEMS AND METHODS FOR RESETTING AFTER OPERATION WITH POOR REDUCTANT QUALITY

(75) Inventors: Stephen Paul Levijoki, Swartz Creek, MI (US); Scott R. Gordon, Ann Arbor, MI (US); Cheryl J Stark, Canton, MI (US); Paul Jasinkiewicz, Northville, MI (US); Brett B Thompson, Farmington Hills, MI (US)

(73) Assignee: GM Global Technology Operations LLC

( * ) Notice: Subject to any disclaimer, the term of this patent is extended or adjusted under 35 U.S.C. 154(b) by 333 days.

(21) Appl. No.: 12/606,483

(22) Filed: Oct. 27, 2009

(65) Prior Publication Data

US 2011/0061363 A1 Mar. 17, 2011

Related U.S. Application Data

(60) Provisional application No. 61/242,084, filed on Sep. 14, 2009.

(51) Int. Cl.
*F01N 3/00* (2006.01)
(52) U.S. Cl. .......................................... 60/295; 60/301
(58) Field of Classification Search ................... 60/277, 60/286, 295, 301
See application file for complete search history.

(56) References Cited

U.S. PATENT DOCUMENTS

| 7,954,312 | B2 * | 6/2011 | Gresens | 60/286 |
|---|---|---|---|---|
| 2004/0206069 | A1 * | 10/2004 | Tumati et al. | 60/285 |
| 2006/0130458 | A1 * | 6/2006 | Solbrig | 60/286 |
| 2007/0044458 | A1 * | 3/2007 | Cheng | 60/295 |
| 2007/0068139 | A1 * | 3/2007 | Brown et al. | 60/277 |
| 2007/0277502 | A1 * | 12/2007 | Duvinage et al. | 60/274 |
| 2008/0022658 | A1 * | 1/2008 | Viola et al. | 60/286 |
| 2008/0132405 | A1 * | 6/2008 | Patchett et al. | 502/74 |
| 2008/0177457 | A1 * | 7/2008 | Ishikawa et al. | 701/103 |
| 2008/0178575 | A1 * | 7/2008 | Shaikh et al. | 60/274 |
| 2009/0293451 | A1 * | 12/2009 | Kesse | 60/274 |

FOREIGN PATENT DOCUMENTS

JP 2003314254 A * 11/2003

OTHER PUBLICATIONS

U.S. Appl. No. 12/606,512, filed Oct. 27, 2009, Stephen Paul Levijoki.

* cited by examiner

*Primary Examiner* — Thomas Denion
*Assistant Examiner* — Patrick Maines

(57) ABSTRACT

An exhaust diagnostic system includes a selective catalyst reduction (SCR) efficiency testing module that determines an efficiency of a SCR catalyst. An exhaust gas temperature management module selectively adjusts a temperature of the SCR catalyst to a predetermined temperature range using intrusive exhaust gas temperature management. A test enabling module initiates an SCR efficiency test using the SCR efficiency module after failing a prior SCR efficiency test and while the temperature of the SCR catalyst is within the predetermined temperature range.

18 Claims, 4 Drawing Sheets

EXHAUST DIAGNOSTIC SYSTEMS AND METHODS FOR RESETTING AFTER OPERATION WITH POOR REDUCTANT QUALITY

CROSS-REFERENCE TO RELATED APPLICATIONS

This application claims the benefit of U.S. Provisional Application No. 61/242,098, filed on Sep. 14, 2009. The disclosure of the above application is incorporated herein by reference in its entirety.

This application is related to U.S. application Ser. No. 12/606,512, filed on Oct. 27, 2009, which claims the benefit of U.S. Provisional Application No. 61/242,084, filed on Sep. 14, 2009. The disclosures of the above applications are incorporated herein by reference in their entirety.

FIELD

The present disclosure relates to vehicle exhaust systems, and more particularly to exhaust diagnostic systems and methods that test selective catalyst reduction (SCR) efficiency.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

During combustion in a diesel engine, an air/fuel mixture is delivered through an intake valve to cylinders and is compressed and combusted therein. After combustion, the piston forces the exhaust gas in the cylinders into an exhaust system. The exhaust gas may contain oxides of nitrogen ($NO_x$) and carbon monoxide (CO).

Exhaust gas treatment systems may employ selective catalytic reduction (SCR) catalysts to reduce nitrogen oxides (NOx). A catalyst converts the NOx into nitrogen $N_2$ and water $H_2O$. Reductant may be added to the exhaust gas upstream from the SCR catalyst. For example only, the reductant may include anhydrous ammonia, aqueous ammonia or urea.

Exhaust systems with SCR catalysts are vulnerable to poor quality reductant. If a reductant tank has been filled with poor quality reductant, an exhaust diagnostic system will detect a low SCR conversion efficiency. In some vehicles, the engine control module may limit the speed of the vehicle and/or perform other remedial actions. The poor quality reductant should be replaced with higher quality reductant to correct the problem.

SUMMARY

An exhaust diagnostic system includes a selective catalyst reduction (SCR) efficiency testing module that determines an efficiency of a SCR catalyst. An exhaust gas temperature management module selectively adjusts a temperature of the SCR catalyst to a predetermined temperature range using intrusive exhaust gas temperature management. A test enabling module initiates an SCR efficiency test using the SCR efficiency module after failing a prior SCR efficiency test and while the temperature of the SCR catalyst is within the predetermined temperature range.

In other features, the SCR efficiency testing module tests the efficiency of the SCR catalyst after adjusting dosing of the SCR catalyst to a predetermined level. A speed limiting module limits a speed of a vehicle after the vehicle fails the prior SCR efficiency test. A reset module resets the speed limiting module if the SCR efficiency test is passed.

In other features, the SCR catalyst has a temperature in a first temperature range after failing the prior SCR efficiency test. The first temperature range is lower than and distinct from the predetermined temperature range.

In other features, the exhaust gas temperature management module increases fuel in the exhaust gas by at least one of adjusting fueling and injecting HC fuel into the exhaust gas using a HC injector to increase the temperature of the SCR catalyst.

In other features, the SCR efficiency testing module includes a test enable module that selectively enables testing of the SCR efficiency when at least one of particulate filter regeneration is not being performed and adaptation control of the SCR catalysts is not being performed.

In other features, an inlet temperature sensor senses an inlet temperature of the SCR catalyst. An outlet temperature sensor senses an outlet temperature of the SCR catalyst. The temperature of the SCR catalyst is calculated based on the inlet and outlet temperatures.

In other features, the temperature calculating module calculates the temperature of the SCR catalyst based on inlet and outlet temperatures of the SCR catalyst. A fuel adjustment module adjusts at least one of fueling and injects hydrocarbon (HC) fuel in the exhaust stream to increase a temperature of the SCR catalyst.

In other features, the selective catalyst reduction (SCR) efficiency testing module disables exhaust gas recirculation after the prior SCR efficiency test and prior to the SCR efficiency test.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The present disclosure will become more fully understood from the detailed description and the accompanying drawings, wherein.

DETAILED DESCRIPTION OF THE PREFERRED EMBODIMENTS

Figure 1:
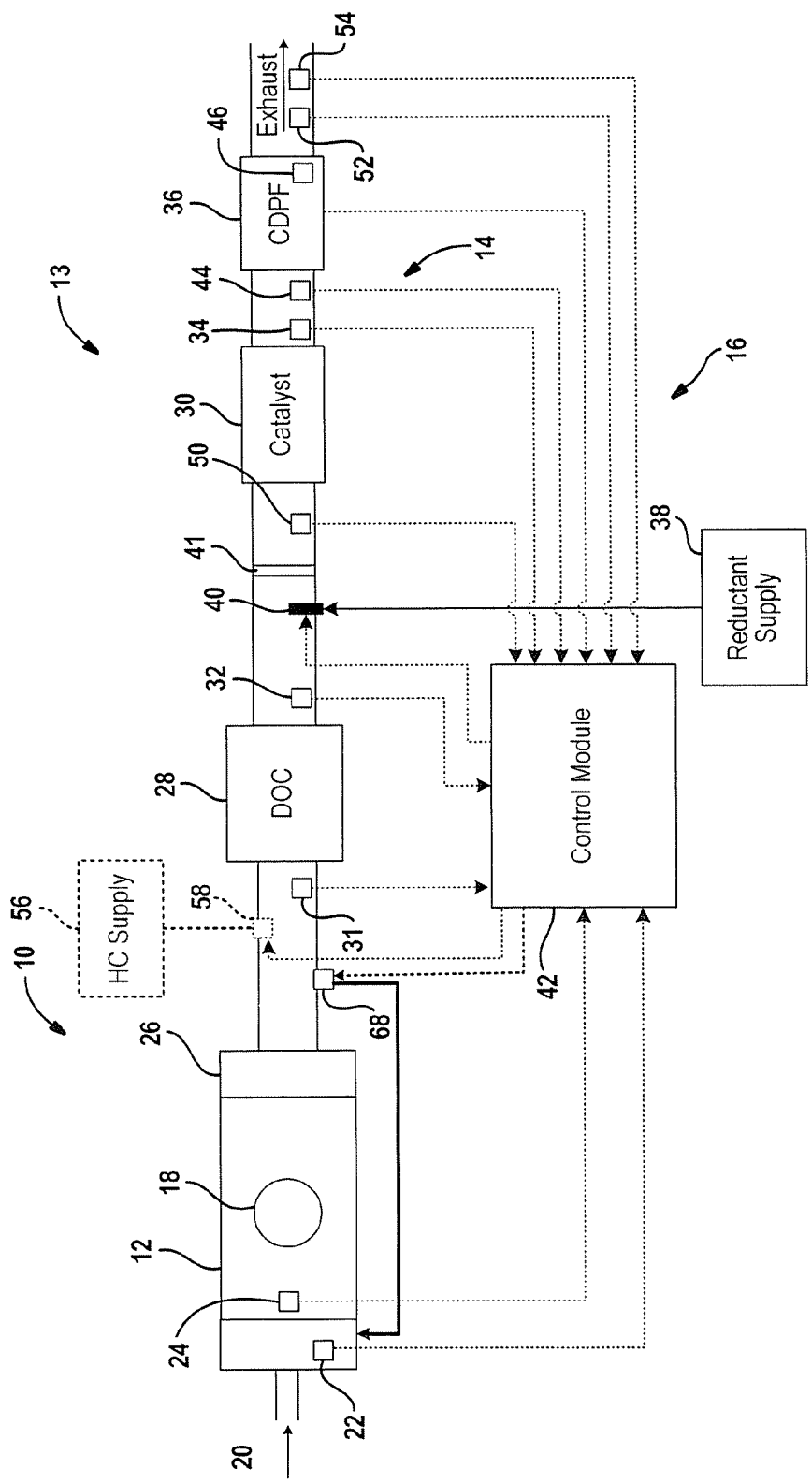
FIG. 1 is a functional block diagram of an engine control system including an exhaust diagnostic system that automatically resets after operating with poor diesel reductant quality according to the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable hardware components that provide the described functionality.

While the following disclosure involves diesel engines, other types of engines such as gasoline engines, including direct injection engines, may benefit from the teachings herein.

After the vehicle is speed limited and/or other remedial action is taken, it may be difficult to calculate the SCR conversion efficiency to identify when the reductant has been replaced. The lower speeds of the vehicle will not allow sufficient heat to build up in the SCR catalyst. Thus, the temperature of the SCR may not reach a proper temperature range for testing SCR efficiency. For example only, the temperature range may be <250° C. during speed limitation. Testing the SCR efficiency is usually performed at higher SCR catalyst temperatures. When the higher quality reductant is replaced, there should be a way to reset the exhaust diagnostic system. Currently, there is no method to reset the exhaust diagnostic system after the speed of the vehicle is limited due poor reductant quality, which leads to low SCR efficiency.

One approach to the problem involves resetting the exhaust diagnostic system using a scan tool at a service shop. This solution is unfavorable due to the fact that scan tools are readily available to the general public. Therefore, vehicle operators can reset the exhaust diagnostic system at will, which would allow non-compliant fluids such as water to be used instead of reductant. Furthermore, customers who not have scan tools need to visit the dealer for a reset.

The present disclosure automatically (or via an intrusive service test which is initiated by the service test tool) resets an exhaust diagnostic system of a vehicle after the SCR catalyst is operated with poor quality reductant and vehicle speed is limited and/or other remedial action is taken.

The exhaust diagnostic system according to the present disclosure elevates the exhaust temperature using intrusive exhaust gas temperature management so that a temperature of the SCR catalyst is high enough to allow testing of the efficiency of the SCR catalyst. If the SCR efficiency is above a predetermined threshold, limitations on the vehicle speed and/or other remedial actions can be removed without requiring a scan tool. In other words, the exhaust system diagnostic can self-heal (or via an intrusive service test which is initiated by the service test tool) after failing the SCR efficiency test due to poor quality reductant.

Referring now to FIG. 1, a diesel engine system 10 is schematically illustrated. The diesel engine system 10 includes a diesel engine 12 and an exhaust treatment system 13. The exhaust treatment system 13 further includes an exhaust system 14 and a dosing system 16. The diesel engine 12 includes a cylinder 18, an intake manifold 20, a mass air flow (MAF) sensor 22 and an engine speed sensor 24. Air flows into the diesel engine 12 through the intake manifold 20 and is monitored by the MAF sensor 22. The air is directed into the cylinder 18 and is combusted with fuel to drive pistons (not shown). Although a single cylinder 18 is illustrated, it can be appreciated that the diesel engine 12 may include additional cylinders 18. For example, diesel engines having 2, 3, 4, 5, 6, 8, 10, 12 and 16 cylinders are anticipated.

Exhaust gas is produced inside the cylinder 18 as a result of the combustion process. The exhaust system 14 treats the exhaust gas before the exhaust gas is released to atmosphere. The exhaust system 14 includes an exhaust manifold 26 and a diesel oxidation catalyst (DOC) 28. The exhaust manifold 26 directs exhaust exiting the cylinder through the DOC 28. The exhaust is treated within the DOC 28 to reduce the emissions. The exhaust system 14 further includes an SCR catalyst 30, a temperature sensor 31, an inlet temperature sensor 32, an outlet temperature sensor 34 and a particulate filter (PF) 36.

The temperature sensor 31 may be positioned between the engine and the DOC 18. The inlet temperature sensor 32 is located upstream from the SCR catalyst 30 to monitor the temperature change at the inlet of the SCR catalyst 30. The outlet temperature sensor 34 is located downstream from the SCR catalyst 30 to monitor the temperature change at the outlet of the SCR catalyst 30. Although the exhaust treatment system 13 is illustrated as including the inlet and outlet temperature sensors 32, 34 arranged outside the SCR catalyst 30, the inlet and outlet temperature sensors 32, 34 can be located inside the SCR catalyst 30 to monitor the temperature change of the exhaust at the inlet and outlet of the SCR catalyst 30. The PF 36 further reduces emissions by trapping particulates (i.e., soot) in the exhaust gas.

The dosing system 16 includes a dosing injector 40 that injects reductant from a reductant fluid supply 38 into the exhaust gas. The reductant mixes with the exhaust gas and further reduces the emissions when the mixture is exposed to the SCR catalyst 30. A mixer 41 may be used to mix the reductant with the exhaust gas upstream from the SCR catalyst 30. A control module 42 regulates and controls the operation of the engine system 10.

An exhaust gas flow rate sensor 44 may generate a signal corresponding to the flow of exhaust in the exhaust system. Although the sensor is illustrated between the SCR catalyst 30 and the PF 36, various other locations within the exhaust system may be used for measurement including after the exhaust manifold and before the SCR catalyst 30.

A temperature sensor 46 generates a particulate filter temperature corresponding to a measured particulate filter temperature. The temperature sensor 46 may be disposed on or within the PF 36. The temperature sensor 46 may also be located upstream or downstream from the PF 36.

Other sensors in the exhaust system may include an upstream NOx sensor 50 that generates a NOx signal based on NOx in the exhaust system. A downstream NOx sensor 52 may be positioned downstream from the PF 36 to measure NOx leaving the PF 36. In addition, an ammonia ($NH_3$) sensor 54 generates a signal corresponding to the amount of ammonia within the exhaust gas. The $NH_3$ sensor 54 is optional, but can be used to simplify the control system due to the ability to discern between NOx and $NH_3$. Alternately and/or in addition, a hydrocarbon (HC) supply 56 and a HC injector 58 may be provided to supply HC in the exhaust gas reaching the DOC catalyst. The control module selectively opens and closes an exhaust gas recirculation (EGR) valve 68 to recirculate exhaust gas.

Figure 2:
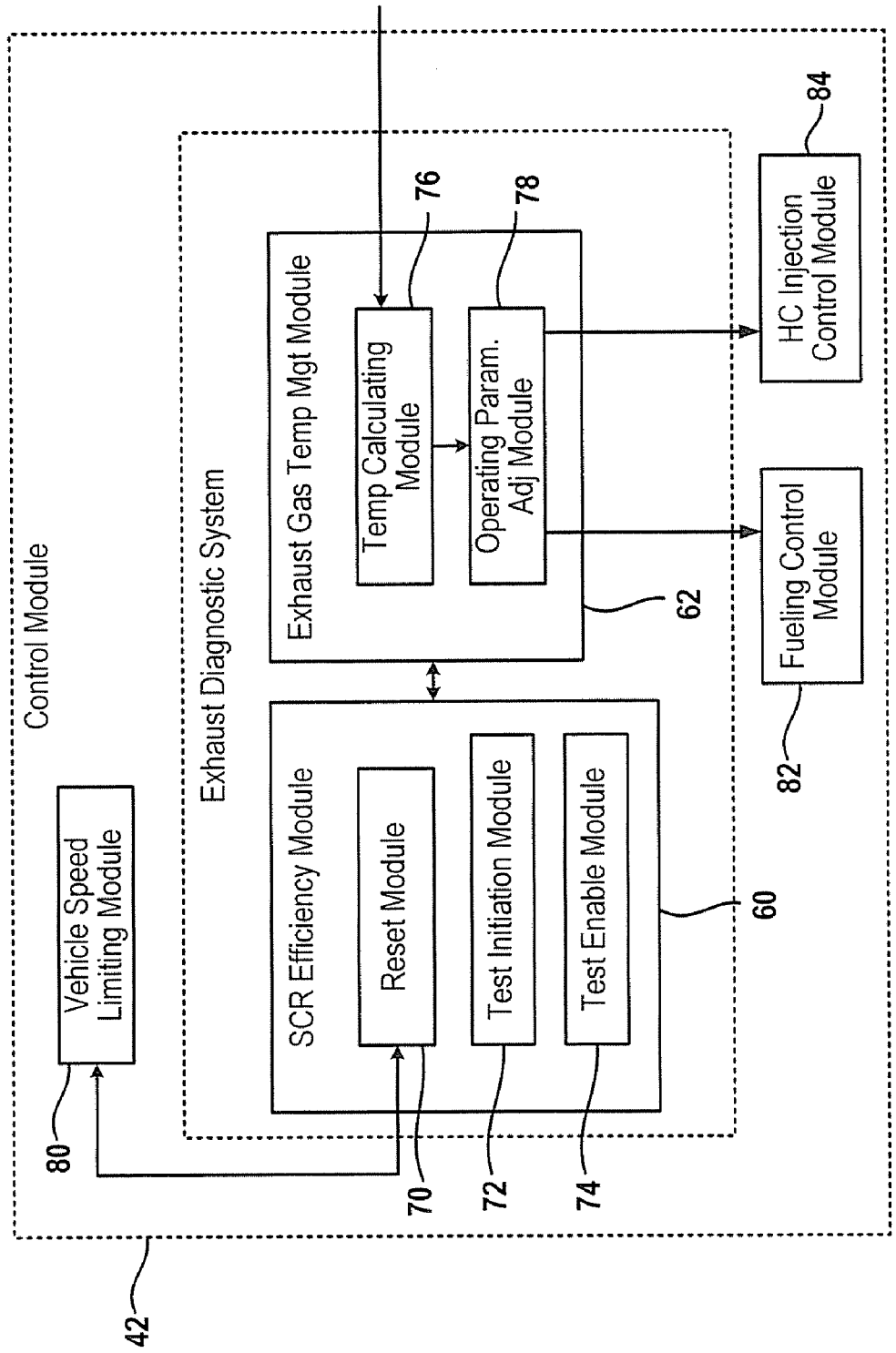
FIG. 2 is a functional block diagram of an exemplary implementation of a control module of the exhaust diagnostic system of FIG. 1.

Referring now to FIG. 2, the control module 42 may include an SCR efficiency testing module 60 that is used to determine the conversion efficiency of NOx at the SCR catalyst 30. The control module 42 further includes an exhaust gas temperature management module 62 that intrusively controls a temperature of the SCR catalyst 30.

The SCR efficiency testing module 60 includes a reset module 70 and a test initiation module 72. As used herein, the term intrusive means that the control module 42 varies the control of the engine outside of the optimum operating conditions from an emissions perspective to allow the test to occur. The test initiation module 72 initiates an intrusive SCR efficiency test after the SCR catalyst 30 fails a prior SCR efficiency test and vehicle speed limiting and/or other remedial action is taken.

The intrusive test initiation module 72 sends a signal to the exhaust gas temperature management module 62 to initiate intrusive temperature control of the SCR prior to an SCR efficiency test. The test enabling module 74 ensures that enable conditions are met prior to testing.

The exhaust gas temperature management module 62 includes an SCR temperature calculating module 76 that calculates a temperature of the SCR. The temperature calculating module 76 may calculate the temperature of the SCR catalyst based on the inlet temperature sensor 32, the outlet temperature sensor 34, a model or any other suitable method. For example only, the temperature calculating module 76 may calculate the SCR temperature based on values from both the inlet and outlet temperature sensors 32, 34. For example only, the temperature calculating module 76 may calculate the temperature based on an average or a weighted average of the inlet and outlet temperature sensors 32, 34.

The control module 42, the SCR efficiency testing module 60 and/or the exhaust gas temperature management module 62 may include an operating parameter adjustment module 78 that adjusts other operating parameters prior to the intrusive SCR efficiency test. For example, other operating parameters such as dosing, $NH_3$ load, EGR, and/or other conditions may also be adjusted within corresponding windows prior to the intrusive SCR efficiency test.

The control module 42 includes a vehicle speed limiting module 80 that limits vehicle speed after the SCR efficiency falls below a predetermined efficiency. The control module 42 further includes a fueling control module 82 that determines fuel quantity, fuel injection timing, post injection, etc. When in the intrusive SCR test mode, the exhaust gas temperature management module 62 adjusts fueling. The fueling adjustment increases a temperature of the SCR catalyst. Alternately, a hydrocarbon injection module 84 injects fuel into the exhaust upstream from the DOC catalyst 28 to generate an exotherm to increase the temperature in the SCR.

Figure 3:
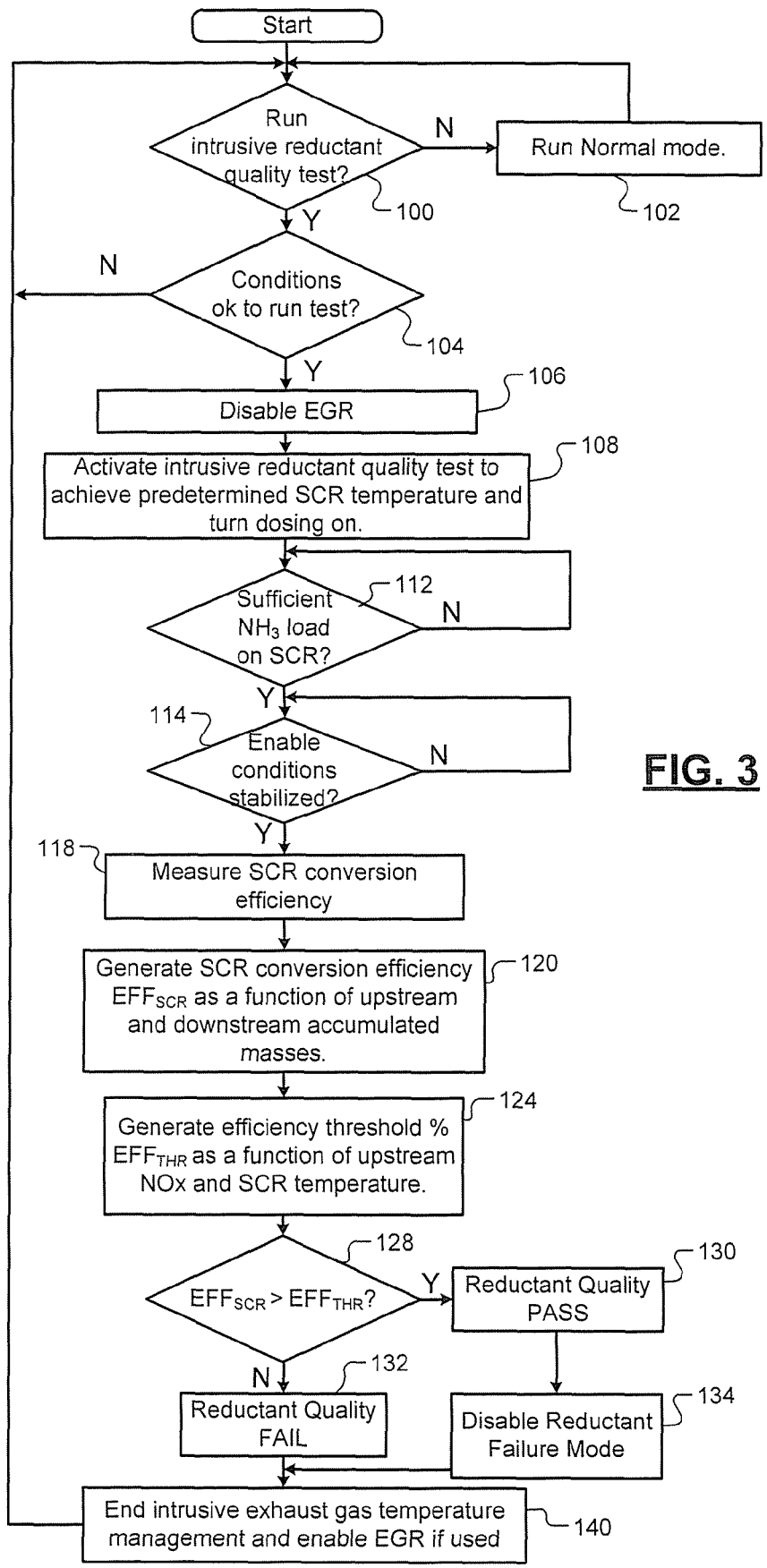
FIG. 3 illustrates a method for resetting an exhaust diagnostic system after operating with poor diesel reductant quality according to the present disclosure.

Referring now to FIG. 3, control begins at 100 where control determines whether an intrusive reductant quality test needs to run. For example only, the intrusive reductant quality test is run after the vehicle is placed in a speed limited mode and/or other remedial action is taken after failing to pass a prior SCR efficiency test.

If 100 is false, control runs in a normal mode at 102. If 100 is true, control continues at 104 and determines whether a first set of conditions are acceptable to run the test. For example only, the first set of conditions may include ensuring that regeneration of the PF 36 is not being performed. PF regeneration is typically performed when soot builds up in the PF 36. Additionally, the first set of conditions may include ensuring that adaptation is not being performed. Adaptation occurs when there is a problem with the SCR catalyst such that the downstream NOx sensor measurements vary from a model by a predetermined amount. Still other conditions may be used in the first set of conditions instead of or in addition to these conditions.

If 104 is false, control returns to 100. If 104 is true, control continues at 106 and optionally disables exhaust gas recirculation (EGR). At 108, control activates an intrusive SCR test to achieve a predetermined SCR temperature range. Control also turns dosing on at 108. At 112, control determines whether there is a sufficient $NH_3$ load on the SCR catalyst 30. A time delay may be used to ensure that the sufficient $NH_3$ load has been re-established to provide acceptable NOx conversion.

If 112 is false, control waits until there is a sufficient $NH_3$ load on the SCR. At 114, control determines whether a second set of enable conditions have been met. For example only, the second set of enable conditions may include one or more of the following conditions: exhaust flow within a predetermined range; upstream NOx mass flow within a predetermined range; upstream NOx concentration within a predetermined range and/or NOx sensors ready. Still other conditions may be included in the second set of enable conditions.

At 118, control measures the SCR conversion efficiency $EFF_{SCR}$. At 120, control generates SCR conversion efficiency $EFF_{SCR}$ as a function of upstream and downstream accumulated masses. At 124, control generates an efficiency threshold $EFF_{THR}$ as a function of upstream NOx and SCR temperature. The SCR conversion efficiency threshold $EFF_{THR}$ may be a percentage.

At 128, control determines whether $EFF_{SCR} > EFF_{THR}$. If 128 is true, control declares a reductant quality pass status (and/or SCR efficiency status) at 130. If 128 is false, control declares a reductant quality FAIL status (and/or an SCR efficiency FAIL status) at 132. Control continues from 130 with 134 and disables the reductant failure mode. For example, the vehicle speed limiting mode and/or other remedial measures are ended. Control continues from 132 and 134 with 140 where control ends intrusive exhaust gas temperature management and enables EGR (if previously disabled).

Figure 4:
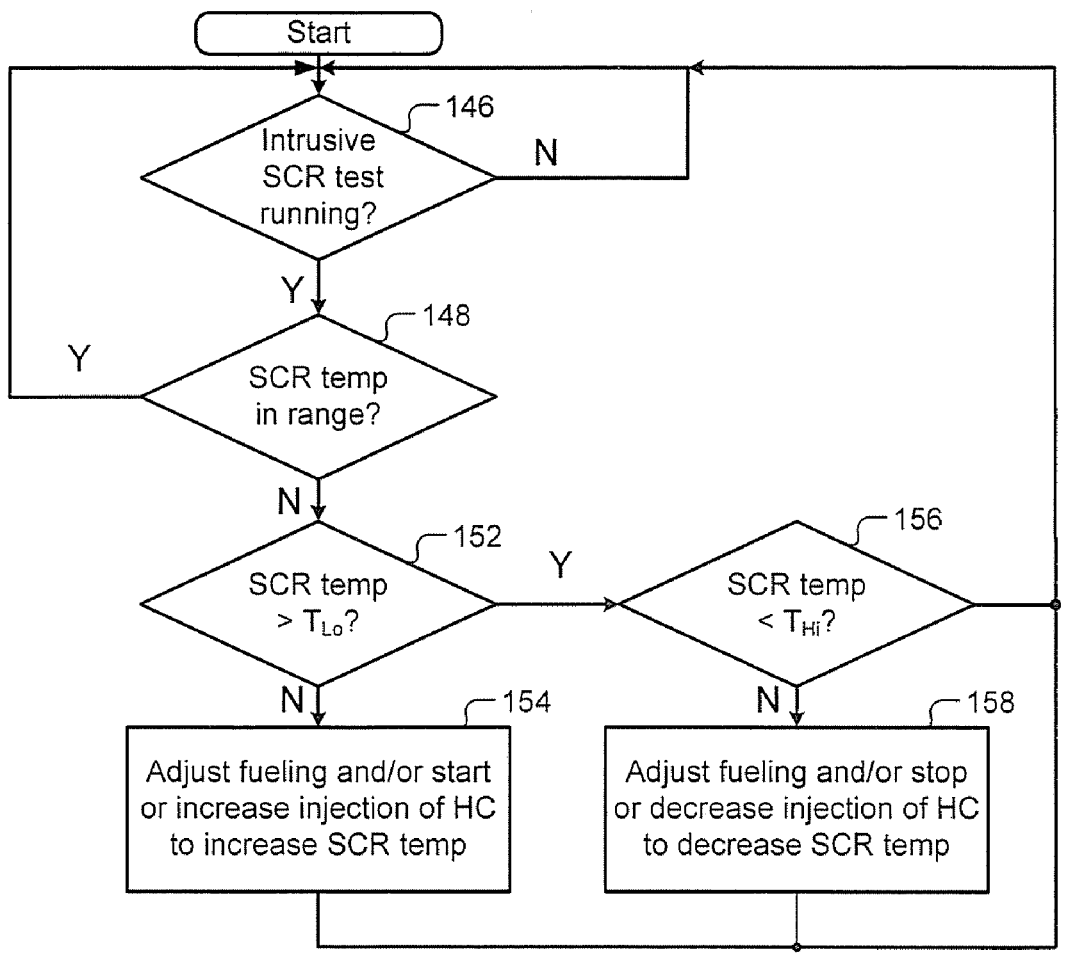
FIG. 4 illustrates a method for controlling the temperature of the SCR catalyst.

Referring now to FIG. 4, an intrusive exhaust gas temperature management method is shown. At 146, control determines whether the intrusive SCR test is running. If 146 is false, control returns to 146. If 146 is true, control continues at 148 where control determines whether the SCR temperature is within a predetermined temperature range (for example, $T_{Lo}$ and $T_{Hi}$).

If 148 is true, control returns to 146. If 148 is false, control determines whether the SCR temperature is greater than $T_{Lo}$ at 152. If 152 is false, control increases the exhaust temperature in any suitable manner. For example, the exhaust temperature can be increased by altering fueling (fuel quantity, fuel injection timing, post injection, etc.) and/or by starting or increasing HC injection at 154. Control returns to 146.

If 148 is false, control determines whether the SCR temperature is less than $T_{Hi}$ at 156. If 156 is false, control decreases the exhaust temperature in any suitable manner. For example, the exhaust temperature can be decreased by altering fueling (fuel quantity, fuel injection timing, post injection, etc.) and/or by stopping or decreasing HC injection at 158. Control returns to 146.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:
1. An exhaust diagnostic system, comprising:
   a selective catalyst reduction (SCR) efficiency testing module that determines an efficiency of an SCR catalyst and that initiates a first SCR efficiency test;
   a limiting module that adjusts operation of an engine to a limited engine operating mode when the first SCR efficiency test fails, wherein a temperature of the SCR cata- lyst falls below a predetermined temperature range when operating in the limited engine operating mode; and an exhaust gas temperature management module that selectively adjusts the temperature of the SCR catalyst to the predetermined temperature range using intrusive exhaust gas temperature management during the operation of the engine in the limited engine operating mode, wherein the SCR efficiency testing module initiates a second SCR efficiency test while the temperature of the SCR catalyst is within the predetermined temperature range.

2. The exhaust diagnostic system of claim 1, wherein the SCR efficiency testing module tests the efficiency of the SCR catalyst after dosing the SCR catalyst.

3. The exhaust diagnostic system of claim 1, wherein the limiting module limits a speed of a vehicle.

4. The exhaust diagnostic system of claim 3, further comprising a reset module that resets the limiting module if the second SCR efficiency test is passed.

5. The exhaust diagnostic system of claim 1, wherein the exhaust gas temperature management module controls fueling of the engine during the intrusive exhaust gas temperature management.

6. The exhaust diagnostic system of claim 1, wherein the SCR efficiency testing module includes a test enable module that selectively enables testing of the SCR efficiency when at least one of:
  particulate filter regeneration is not being performed; and
  adaptation control of the SCR catalyst is not being performed.

7. The exhaust diagnostic system of claim 1, further comprising:
  an inlet temperature sensor that senses an inlet temperature of the SCR catalyst; and
  an outlet temperature sensor that senses an outlet temperature of the SCR catalyst,
  wherein the temperature of the SCR catalyst is calculated based on the inlet and outlet temperatures.

8. The exhaust diagnostic system of claim 1, further comprising:
  a temperature calculating module that calculates the temperature of the SCR catalyst based on inlet and outlet temperatures of the SCR catalyst; and
  a fuel adjustment module that adjusts fueling of the engine during the intrusive exhaust gas temperature management.

9. The exhaust diagnostic system of claim 1, wherein the SCR efficiency testing module disables exhaust gas recirculation after the first SCR efficiency test and prior to the second SCR efficiency test.

10. A method comprising:
  determining an efficiency of a SCR catalyst during a first SCR efficiency test;
  adjusting operation of an engine to a limited engine operating mode when the first SCR efficiency test fails, wherein a temperature of the SCR catalyst falls below a predetermined temperature range when operating in the limited engine operating mode;
  selectively adjusting the temperature of the SCR catalyst to the predetermined temperature range using intrusive exhaust gas temperature management during operation of the engine in the limited engine operating mode; and
  initiating a second SCR efficiency test while the temperature of the SCR catalyst is within the predetermined temperature range.

11. The method of claim 10, further comprising testing the efficiency of the SCR catalyst after adjusting dosing of the SCR catalyst to a predetermined level.

12. The method of claim 10, further comprising limiting a speed of a vehicle after the vehicle fails the first SCR efficiency test.

13. The method of claim 12, further comprising removing the speed limit if the second SCR efficiency test is passed.

14. The method of claim 10, further comprising controlling fueling of the engine during the intrusive exhaust gas temperature management.

15. The method of claim 10, further comprising selectively enabling testing of the SCR efficiency when at least one of:
  particulate filter regeneration is not being performed; and
  adaptation control of the SCR catalyst is not being performed.

16. The method of claim 10, further comprising:
  sensing an inlet temperature of the SCR catalyst;
  sensing an outlet temperature of the SCR catalyst; and
  calculating the temperature of the SCR catalyst based on the inlet and outlet temperatures.

17. The method of claim 10, further comprising:
  calculating the temperature of the SCR catalyst based on inlet and outlet temperatures of the SCR catalyst; and
  adjusting fueling of the engine during the intrusive exhaust gas temperature management.

18. The method of claim 10, further comprising disabling exhaust gas recirculation after the first SCR efficiency test and prior to the second SCR efficiency test.

* * * * *